USO12331927B2

(12) United States Patent
Ryon et al.

(10) Patent No.: US 12,331,927 B2
(45) Date of Patent: Jun. 17, 2025

(54) POSITIONAL CONTROL OF FUEL INJECTION INTO GAS TURBINE COMBUSTORS

(71) Applicant: Collins Engine Nozzles, Inc., Des Moines, IA (US)

(72) Inventors: Jason A. Ryon, Carlisle, IA (US); Philip E. O. Buelow, West Des Moines, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/517,712

(22) Filed: Nov. 22, 2023

(65) Prior Publication Data

US 2025/0164103 A1 May 22, 2025

(51) Int. Cl.
| | |
|---|---|
| *F23C 5/06* | (2006.01) |
| *F23R 3/28* | (2006.01) |
| *F02C 9/28* | (2006.01) |
| *F02D 7/00* | (2006.01) |
| *F23R 3/34* | (2006.01) |

(52) U.S. Cl.
CPC ............... *F23C 5/06* (2013.01); *F23R 3/283* (2013.01); *F02C 9/28* (2013.01); *F02D 7/00* (2013.01); *F05D 2260/96* (2013.01); *F05D 2270/14* (2013.01); *F05D 2270/20* (2013.01); *F23R 3/286* (2013.01); *F23R 3/34* (2013.01)

(58) Field of Classification Search
CPC .......... F23C 5/06; F02D 7/00; F05D 2270/14; F05D 2270/20; F05D 2260/96; F23R 3/283; F23R 3/286
See application file for complete search history.

(56) References Cited

U.S. PATENT DOCUMENTS 2,895,435 A * 7/1959 Bogot ................. F23D 1/00
239/587.5
3,421,702 A * 1/1969 O'Brien ............ B05B 15/654
184/26

(Continued)

FOREIGN PATENT DOCUMENTS

| EP | 2940389 A1 | 11/2015 |
|---|---|---|
| JP | S56121910 U | 9/1981 |

OTHER PUBLICATIONS

Extended European Search Report for EP Application No. 24214925. 0, dated Feb. 26, 2025, 10 pages.

*Primary Examiner* — Todd E Manahan
*Assistant Examiner* — Rene D Ford
(74) *Attorney, Agent, or Firm* — Kinney & Lange, P.A.

(57) ABSTRACT

A system includes a combustor for a gas turbine defining a main axis extending in an upstream-downstream direction, the combustor including a combustor dome bounding an upstream portion of the combustor, wherein a plurality of injector openings are defined through the combustor dome. An injector defines a spray axis aligned with one of the plurality of injector openings for issuing a spray into the combustor along the spray axis. An actuator is operatively connected to the injector for movement of the injector relative combustor dome to adjust a relative position of the spray axis relative to the main axis to alter the position and/or direction of the spray injector during operation of the gas turbine engine.

16 Claims, 8 Drawing Sheets

(56) References Cited

U.S. PATENT DOCUMENTS

| | | | | |
|---|---|---|---|---|
| 3,483,750 | A * | 12/1969 | Pratt | G01K 13/02 |
| | | | | 374/37 |
| 4,304,196 | A | 12/1981 | Chadshay et al. | |
| 4,761,959 | A | 8/1988 | Romey et al. | |
| 6,145,449 | A * | 11/2000 | Kaneko | F23C 5/06 |
| | | | | 239/590.5 |
| 9,920,674 | B2 * | 3/2018 | Stroia | F02M 61/045 |
| 10,527,287 | B2 | 1/2020 | Taliercio et al. | |
| 2004/0003596 | A1 * | 1/2004 | Chin | F23R 3/14 |
| | | | | 60/737 |
| 2010/0175380 | A1 * | 7/2010 | Davis, Jr. | F23R 3/283 |
| | | | | 60/734 |
| 2010/0293953 | A1 | 11/2010 | Wilbraham | |
| 2019/0170357 | A1 | 6/2019 | Taliercio et al. | |
| 2019/0309948 | A1 * | 10/2019 | Prociw | F02C 7/20 |
| 2023/0324040 | A1 * | 10/2023 | Lifshits | F23C 5/06 |
| | | | | 431/8 |
| 2024/0068402 | A1 * | 2/2024 | Ryon | F23R 3/28 |

\* cited by examiner

POSITIONAL CONTROL OF FUEL INJECTION INTO GAS TURBINE COMBUSTORS

BACKGROUND

1. Field

The present disclosure relates to fuel injection, and more particularly to fuel injection in gas turbine combustors.

2. Description of Related Art

Temperature maldistribution, emissions, acoustics, and operability such as lean blow-out and ignition, are all ongoing issues within gas turbine combustors. Having the ability to selectively modify the injection of fuel into the combustor can provide an improvement to these categories.

The conventional techniques have been considered satisfactory for their intended purpose. However, there is an ever present need for improved systems and methods for selectively modifying the injection of fuel into a gas turbine combustor. This disclosure provides a solution for this need.

SUMMARY

A system includes a combustor for a gas turbine defining a main axis extending in an upstream-downstream direction, the combustor including a combustor dome bounding an upstream portion of the combustor, wherein a plurality of injector openings are defined through the combustor dome. An injector defines a spray axis aligned with one of the plurality of injector openings for issuing a spray into the combustor along the spray axis. An actuator is operatively connected to the injector for movement of the injector relative combustor dome to adjust a relative position of the spray axis relative to the main axis.

A high pressure case of a gas turbine engine can be included outboard of the combustor, wherein the actuator can be positioned outside the high pressure case. The actuator can be operatively connected to the injector for rotation of the injector relative combustor dome to adjust a relative angle of the spray axis relative to the main axis. The actuator and injector can be configured to sweep the spray axis over a range of angles relative to the main axis, wherein the range includes a position wherein the spray axis is aligned parallel to the main axis. The actuator can be configured to rotate the injector about a rotation axis that is radial relative to the main axis. The actuator can be configured to rotate the injector about a rotation axis that is perpendicular to and radially offset from the main axis. The actuator can be configured to rotate the injector about a rotation axis that is tangential to and offset from the main axis. The actuator can be configured to move the injector linearly relative to the combustor dome.

The actuator can be configured to move the injector linearly along an actuation axis that is perpendicular to the main axis. The injector can include a nozzle with a sliding top hat seal interfacing and sealing between the nozzle and the combustor dome, wherein the sliding top hat seal is configured to slide relative to the combustor dome and to be stationary relative to the nozzle.

A system includes a combustor for a gas turbine defining a main axis extending in an upstream-downstream direction, the combustor including a combustor dome bounding an upstream portion of the combustor, wherein a plurality of injector openings are defined through the combustor dome. A plurality of injectors each define a respective spray axis aligned with one of the plurality of injector openings for issuing a spray into the combustor along the respective spray axis. At least one actuator is operatively connected to at least a subset of the plurality of injectors for movement of the subset relative combustor dome to adjust a relative position of the respective spray axes of the subset relative to the main axis. A controller is operatively connected to the at least one actuator.

The at least one actuator can be a single actuator operatively connected for movement of the at least the subset of the plurality of injectors. The at least one actuator can be a plurality of individual actuators, each operatively connected to move at least one respective one of the injectors. The at least one actuator and the controller can be configured to actuate the plurality of injectors in banks of injectors.

The at least one actuator can include a plurality of actuators, one for each one of the injectors in the plurality of injectors. The controller can be configured to actuate the plurality of actuators to move each of the injectors in the plurality of injectors identically to one another based on phase of engine operation, and/or for correcting for adverse combustion conditions. The controller can be configured to actuate the plurality of actuators in a regular, circumferential pattern based on phase of engine operation, and/or for correcting for adverse combustion conditions. The controller can be configured to actuate the plurality of actuators to compensate for a faulty one of the injectors, wherein injectors circumferentially neighboring the faulty injector are moved and actuators circumferentially remote from the faulty one of the injectors are moved less than the injectors circumferentially neighboring the faulty injector. The controller can be configured to sweep the plurality of injectors through a range of converging and diverging positions of the spray axes relative to the main axis. The controller can be configured to sweep the plurality of injectors through a range of clock-wise/counter clock-wise tangential positions of the spray axes relative to the main axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
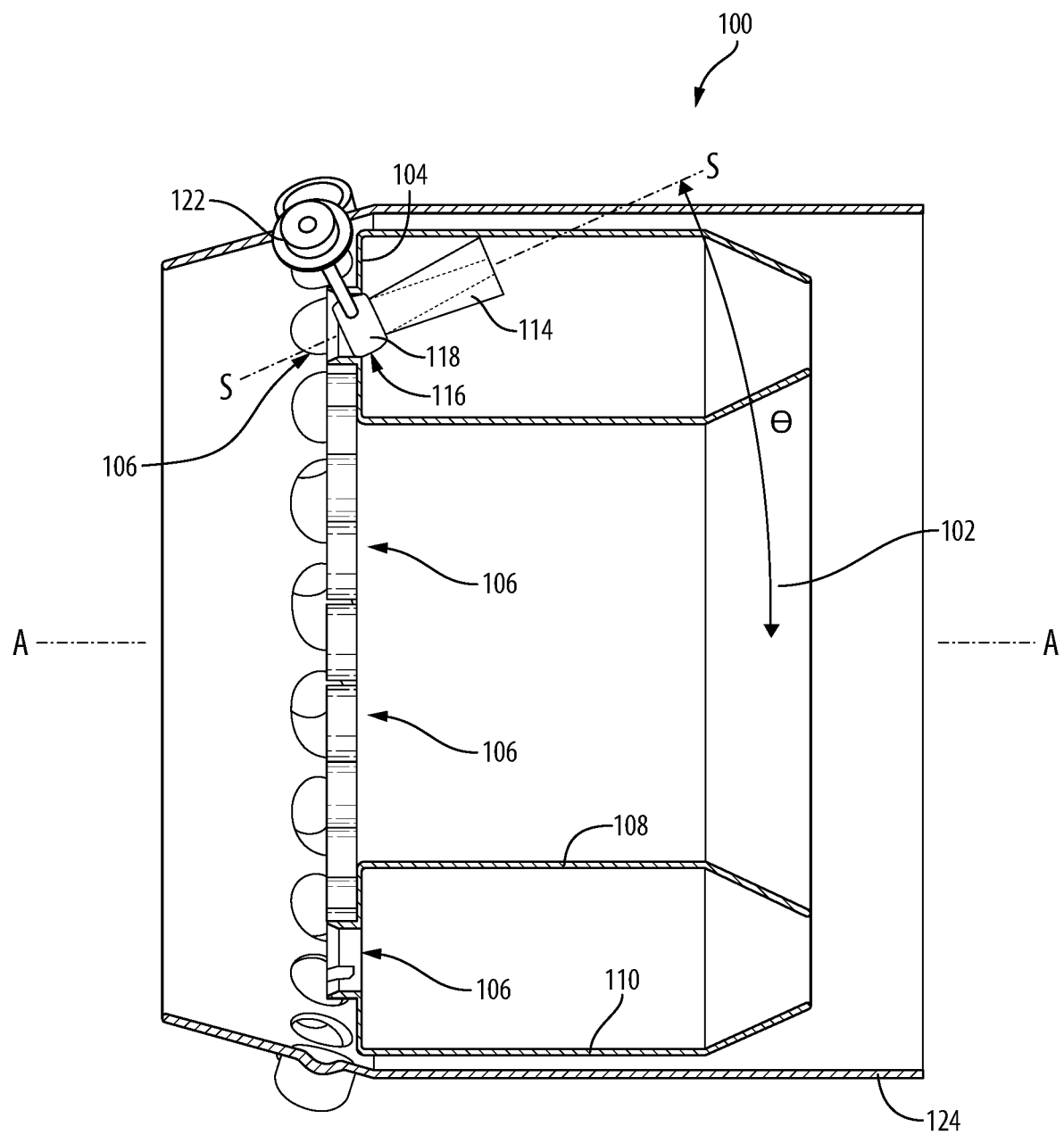
FIG. 1 is a schematic cross-sectional side elevation view of an embodiment of a system constructed in accordance with the present disclosure, showing one of the injectors engaged through the high pressure case and the combustor dome.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-14, as will be described. The systems and methods described herein can be used to provide positional control of fuel injection during operation of gas turbine engines.

Figure 3:
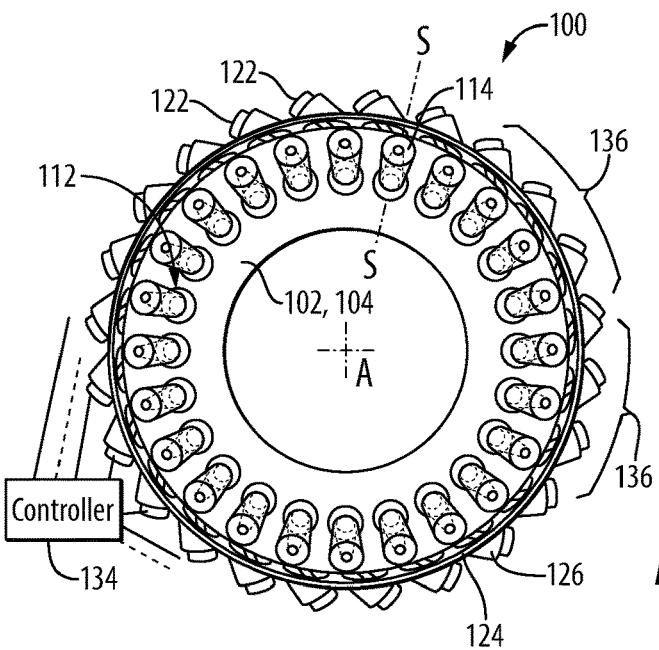
FIG. 3 is an axial end elevation view of the system of FIG. 1, showing all of the injectors in a diverging position.

The system 100 includes a combustor 102 for a gas turbine engine defining a main axis A extending in an upstream-downstream direction. The combustor 102 includes a combustor dome 104 bounding an upstream portion of the combustor 102, wherein a plurality of injector openings 106 are defined through the combustor dome 104. The combustor liner includes inner and outer liner walls 108, 110 extending in a downstream direction from the dome 104. The system 100 includes a plurality of injectors 112 as shown in FIG. 3. An injector 112 defines a spray axis S aligned with one of the plurality of injector openings 106 for issuing a spray 114 (the sprays 114 are indicated schematically throughout the drawings) into the combustor 102 along the spray axis S. The nozzle 116 of the injector 112 has a surface 118 which interfaces with the combustor dome 104 and/or a sealing element 120 (labeled in FIG. 14).

Figure 2:
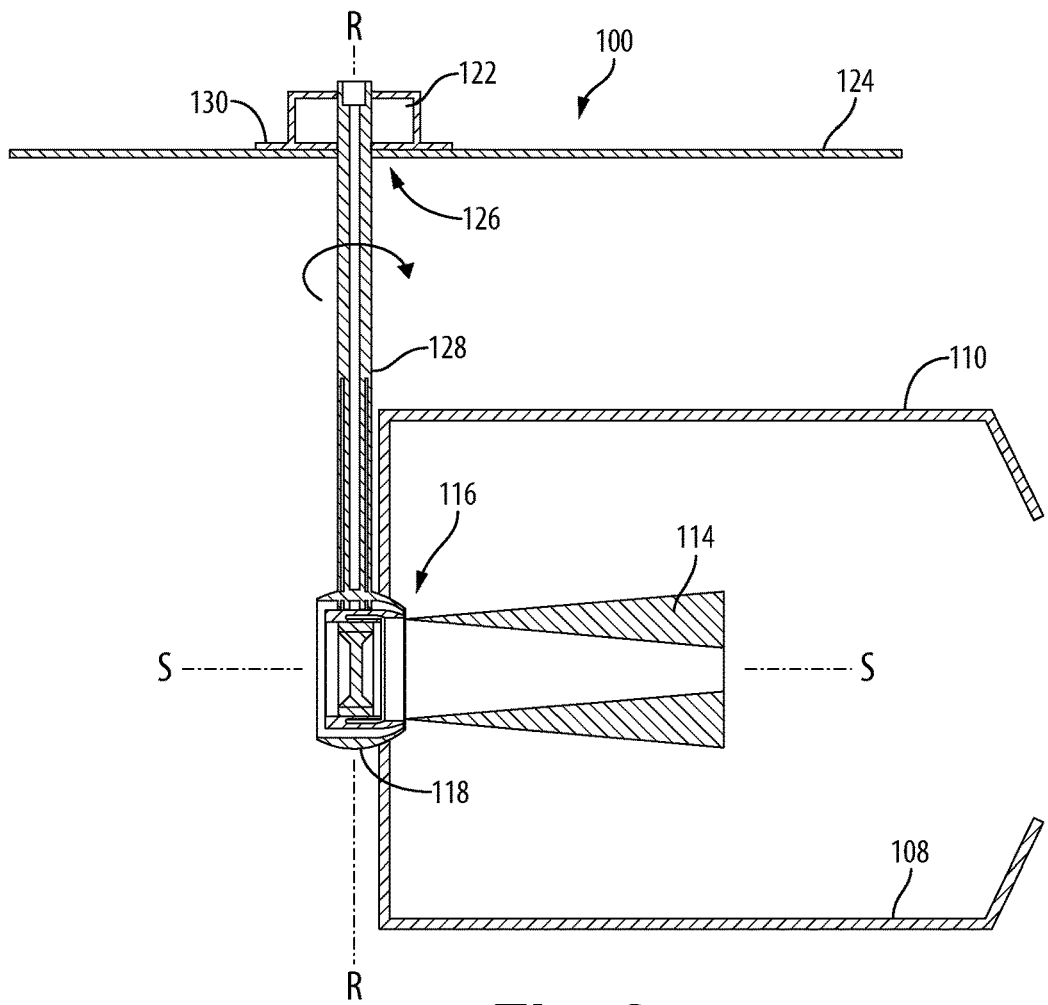
FIG. 2 is a cross-sectional side-elevation view of the injector of FIG. 1, showing the rotational actuator.

With reference to FIG. 2, an actuator 122 is operatively connected to the injector 112 for movement of the injector 112 relative combustor dome 104 to adjust a relative position of the spray axis S relative to the main axis A (labeled in FIGS. 1 and 3) to alter the position and/or direction of the spray 114 from the injector 112 during operation of the gas turbine engine. The actuator 122 is located outside of the high pressure engine case 124, which is outboard of the combustor 102, where it is in a lower temperature environment that inside the case 124 proximate the combustor 102. A feed arm 128 of the injector 112 extends from the actuator 122, through a bore 126 in the high pressure engine case 124, to the nozzle 116 so the actuator can control movement of the nozzle 116.

Figure 4:
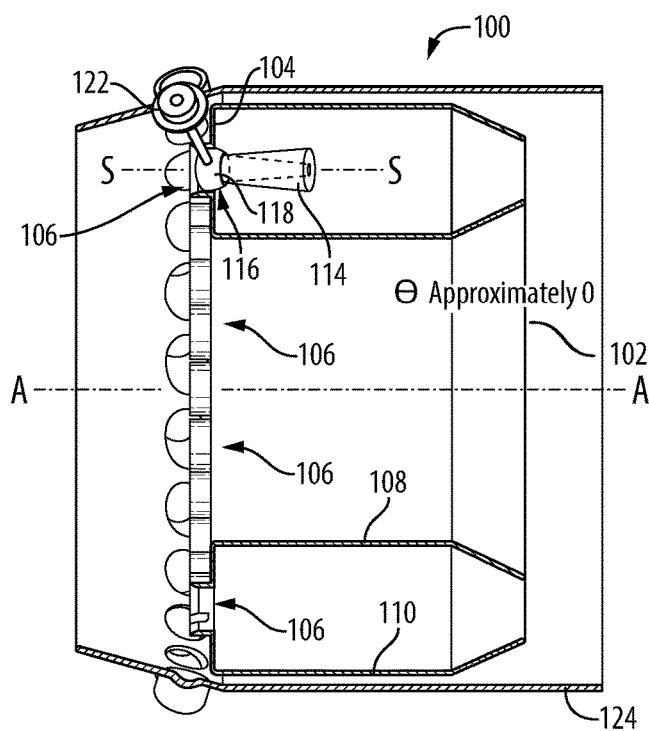
FIGS. 4 and 5 are schematic cross-sectional side and axial elevation views, respectively, of the system of FIG. 1, showing the injectors in a centered position.
Figure 5:
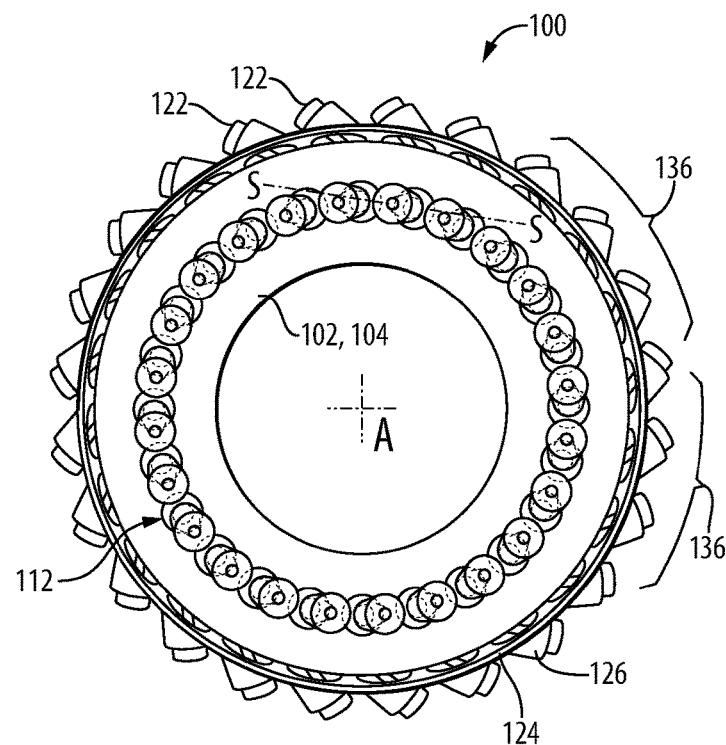

The actuator 122 is operatively connected to the injector 112 for rotation of the injector 112 relative combustor dome 104 to adjust a relative angle θ of the spray axis S relative to the main axis A (labeled in FIGS. 1 and 3). The actuator 122 can include a rotary actuator such as stepper motor or the like, located at the flange 130 of the injector 112, at the opposite end of the feed arm 128 from the nozzle 116. Those skilled in the art will readily appreciate that the actuator 122 does not need to be right at the flange 130 to the high pressure engine case 124, but can be spaced off of the case 124 if needed for thermal considerations, but can still be located within the fuel injector 112. The actuator 122 and injector 112 are configured to sweep the spray axis S over a range of angles θ relative to the main axis A (as labeled in FIG. 1), wherein the range includes a position wherein the spray axis S is aligned parallel or close to parallel with the main axis A, as shown in FIGS. 4-5.

As shown in FIG. 3, the system 100 includes a plurality of injectors 112, each defining its own a respective spray axis S aligned with one of the plurality of injector openings 106 for issuing a spray 114 into the combustor along 102 the respective spray axis S. A controller 134 is operatively connected to the actuators 122 for individual or ganged control of the actuators 122. It is contemplated that in some applications, not all of the injectors 122 need actuators. Some injectors 122 can be stationary. It is also contemplated that a single actuator 122 could actuate a subset of the injectors 112, or a small number of actuators 122 could each actuate a respective subset of the injectors 122 in banks, e.g. using sync rings/segments 136 indicated schematically in FIG. 3. However, there are advantages to configurations with individual spray control, as further detailed below.

Figure 9:
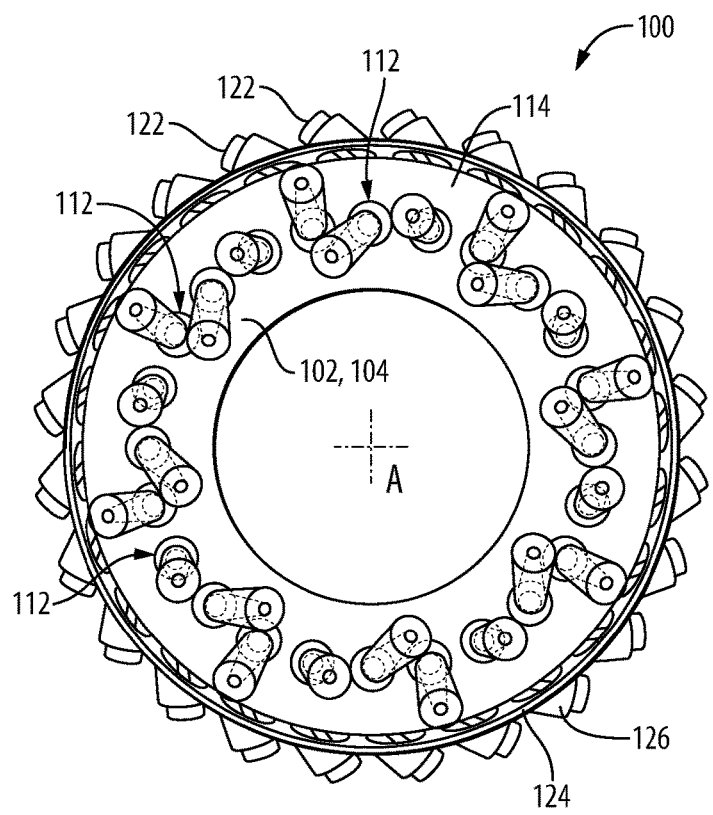

The controller 134 is configured to actuate the plurality of actuators 112 to move each of the injectors 112 in the plurality of injectors identically to one another based on phase of engine operation, such as phase of mission including ground idle, taxiing, take off, cruise, descent, landing, and the like in the case of aircraft, and/or for correcting for adverse combustion conditions. The controller can be configured to perform the operations of the actuators 122, e.g. with machine readable program instructions causing a processor to control the actuators 122. The controller 134 can be configured to actuate the plurality of actuators 122 in a regular, circumferential pattern based on phase of engine operation, and/or for correcting for adverse combustion conditions. FIGS. 1 and 3-7 show regular, circumferential uniformity of the actuators 122 as the actuators are positioned in three different positions but in each position all of the actuators are angled the same so there is no circumferential variation from one actuator 122 to the others. Other regular patterns are also contemplated for the controller 134. For example, in FIG. 8 every other actuator 122 is positioned to converge toward the main axis A, and the remaining actuators 122 are positioned to diverge. FIG. 9 shows another possible regular, circumferentially repeating pattern of three different actuator positions, converging, roughly parallel, and diverging.

Figure 10:
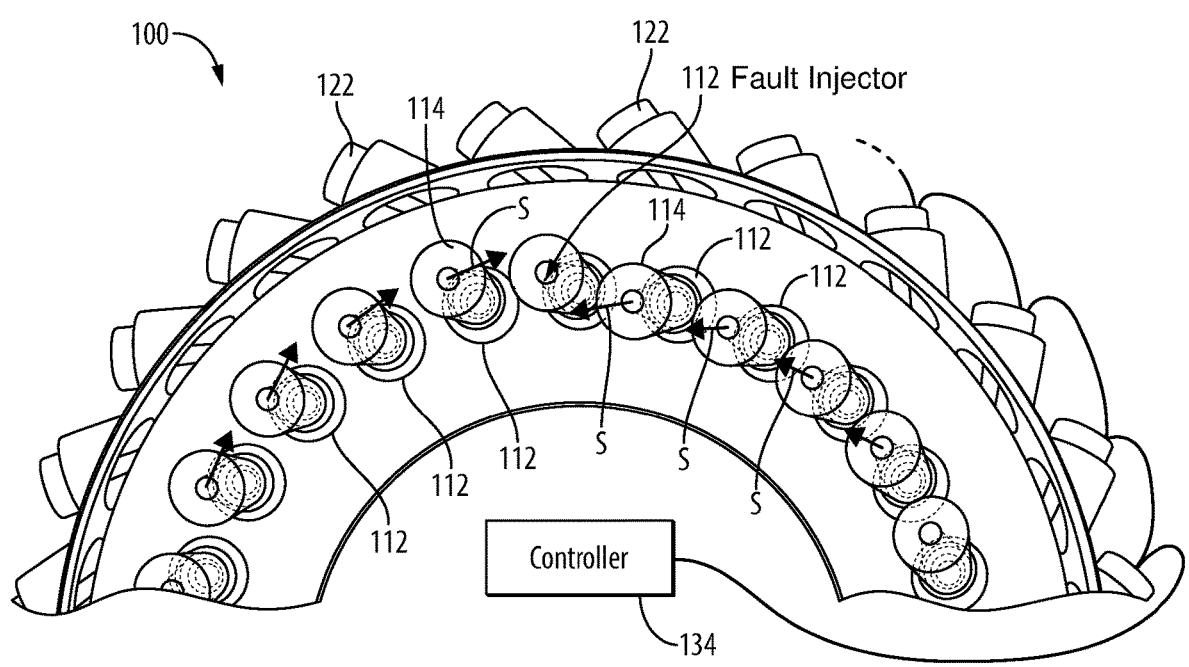
FIG. 10 is a schematic axial end elevation view of the system of FIG. 1, showing a faulted injector and neighboring injectors positioned to compensate.

With reference now to FIG. 10, the controller 134 can be configured to actuate the plurality of actuators 122 to compensate for a faulty one of the injectors 112, wherein injectors 112 circumferentially neighboring the faulty injector 112 are moved by individualize amounts and actuators 122 circumferentially remote from the faulty one of the injectors 112 are moved less than the injectors 112 circumferentially neighboring the faulty injector 112. The adjacent injectors 112 all face in towards the faulty injector 112 to achieve circumferential uniformity in the combustor 102.

Figure 6:
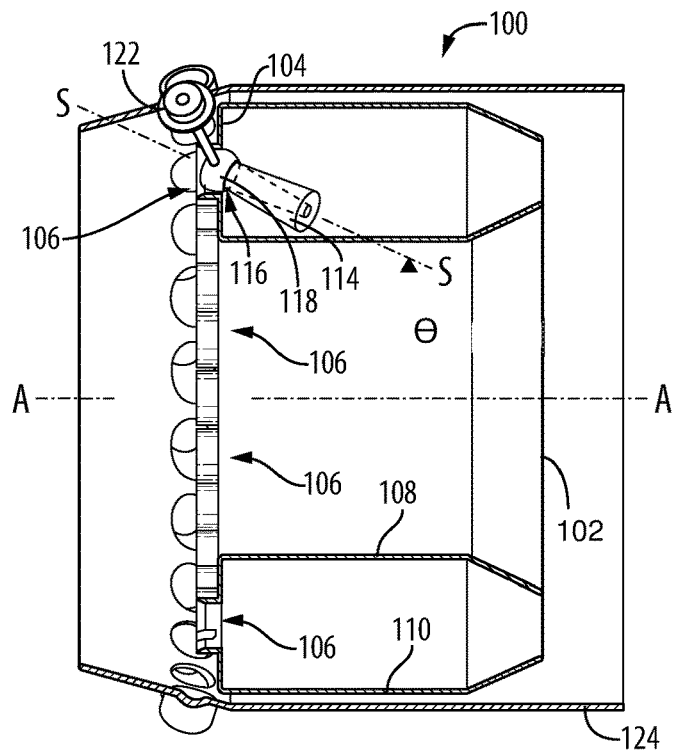
FIGS. 6 and 7 are schematic cross-sectional side and axial elevation views, respectively, of the system of FIG. 1, showing the injectors in a converging, tangential position.
Figure 7:
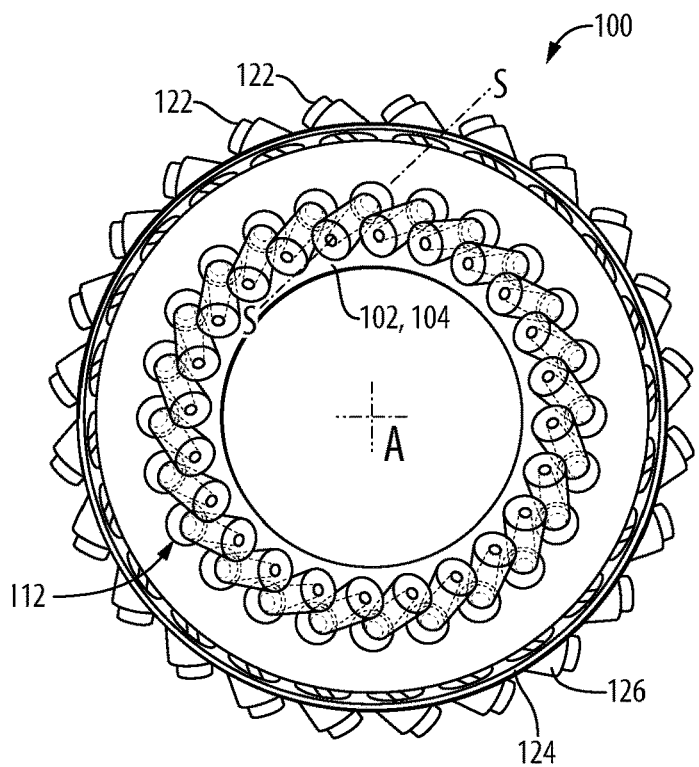
Figure 8:
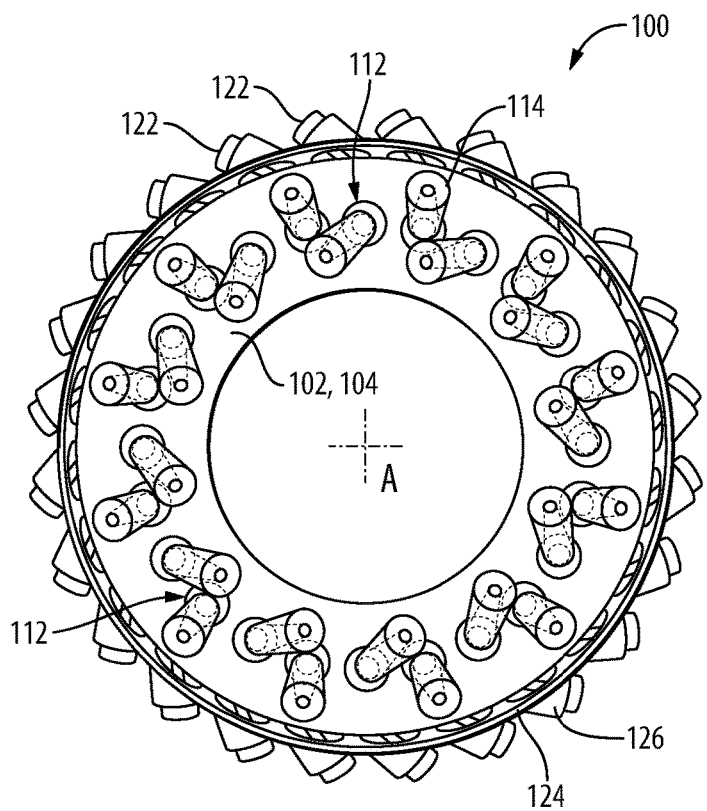
FIGS. 8 and 9 are schematic axial end elevation views of the system of FIG. 1, showing the injectors positioned in two different circumferential patterns.
Figure 11:
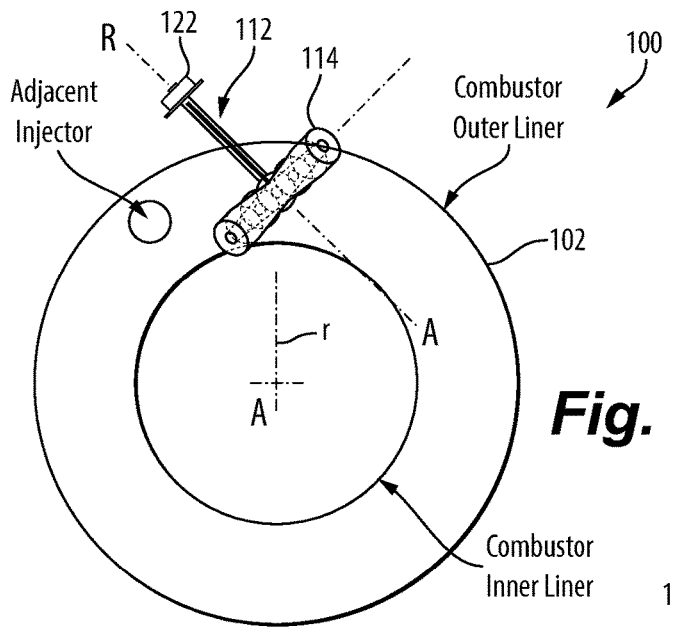
FIG. 11 is a schematic end elevation view of the system of FIG. 1, showing the range of rotation of the injector.
Figure 13:
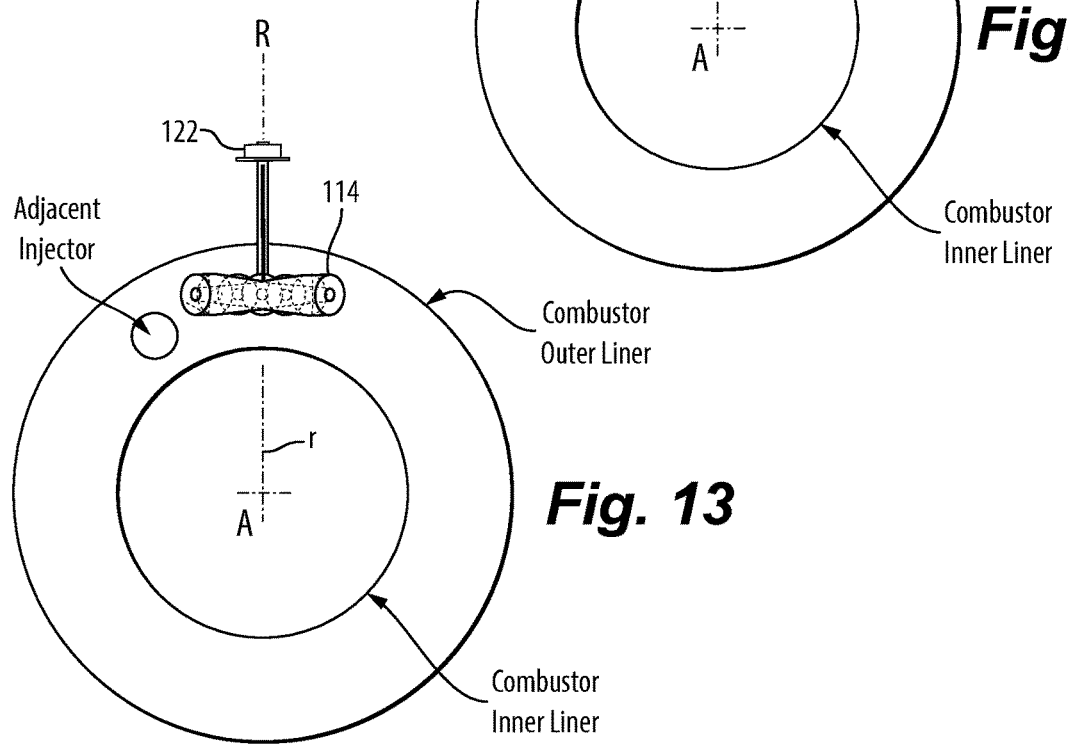
FIG. 13 is a schematic end elevation view of the system of FIG. 1, showing an injector mounted for rotation about a rotation axis perpendicular to the main axis.

The controller 134 is configured to sweep the plurality of injectors 112 through a range of clock-wise/counter clockwise tangential positions of the spray axes relative to the main axis, e.g. using the configurations of FIG. 11 or 13. As shown in FIG. 11, the actuator 122 is configured to rotate the injector 112 about a rotation axis R that is tangential to and offset from the main axis A. The rotation axis R does not intersect the main axis A, but oblique relative to the a radials R of the main axis A. This means the injector spray can be adjusted closer/farther from the combustor liners 108, 110 (labeled in FIG. 1). Also, the injector 112 can be rotated to spray closer/farther from its neighboring injector's sprays, (albeit with some compromise towards/away from the liners 108, 110. This rotation axis R causes the range of angles θ (labeled in FIG. 1) to include positions of the spray axis S that diverge away from the main axis A, as shown in FIGS. 1 and 3, positions parallel or nearly parallel to the main axis A (as shown in FIGS. 4-5), and positions that converge towards the main axis A as shown in FIGS. 6-7. Having all nozzles 116 angled inward (as in FIGS. 6-7) may be desired for low power to concentrate heat. Having all nozzles 116 angled approximately mid-way (as in FIGS. 4-5) may be desired for takeoff to avoid overheating walls/liners 108, 110 (labeled in FIG. 1). Having all nozzles angled outward (as in FIGS. 1 and 3) may be desired for ignition, e.g. to bring the spays 114 into a closer position to ignitors on the outer liner 110 (labeled in FIG. 1).

Figure 12:
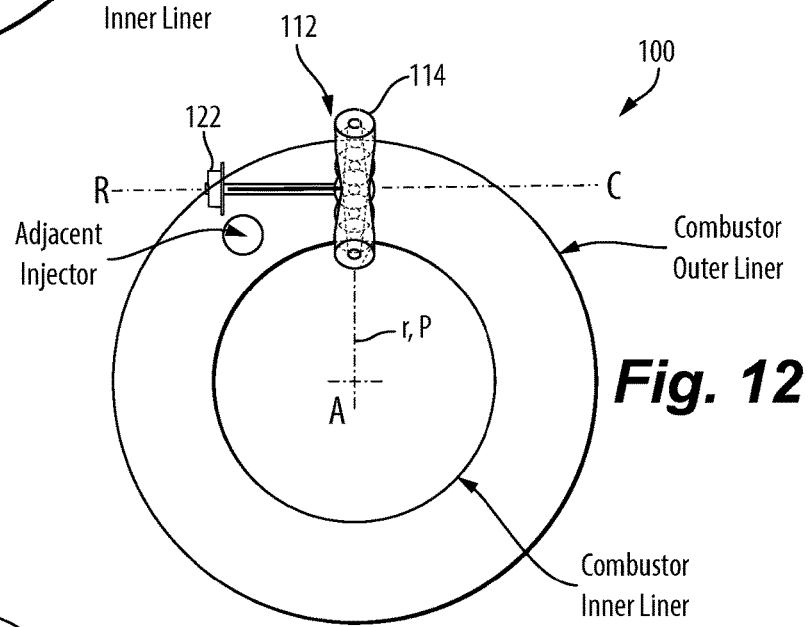
FIG. 12 is a schematic end elevation view of the system of FIG. 1, showing an injector mounted for rotation in a plane perpendicular or radial to the main axis.

As shown in FIG. 12, it is also contemplated that the actuator 122 can be configured to rotate the injector about a rotation axis R that is perpendicular to and radially offset from the main axis A, so the range of angles θ (e.g. as labeled in FIG. 1) is in a plane P oriented radially (the plane is defined by the radius r as oriented in FIG. 12) relative to the main axis A, i.e. the main axis A and the radius r are both in the plane P. This means the injector spray 114 can be adjusted closer/farther from the combustor liners 108, 110, and limits the amount of travel the injectors 112 can be rotated closer/farther from their neighboring injectors 112. As shown in FIG. 13, it is also contemplated that the actuator 112 can be configured to rotate the injector 112 about a rotation axis R that is radial (aligned along a radius r) relative to the main axis A, meaning the injector spray 114 can be adjusted closer/farther from adjacent fuel injectors 112. This limits the amount of travel the injector 112 can be rotated closer/farther from the combustor liners 108, 110.

Figure 14:
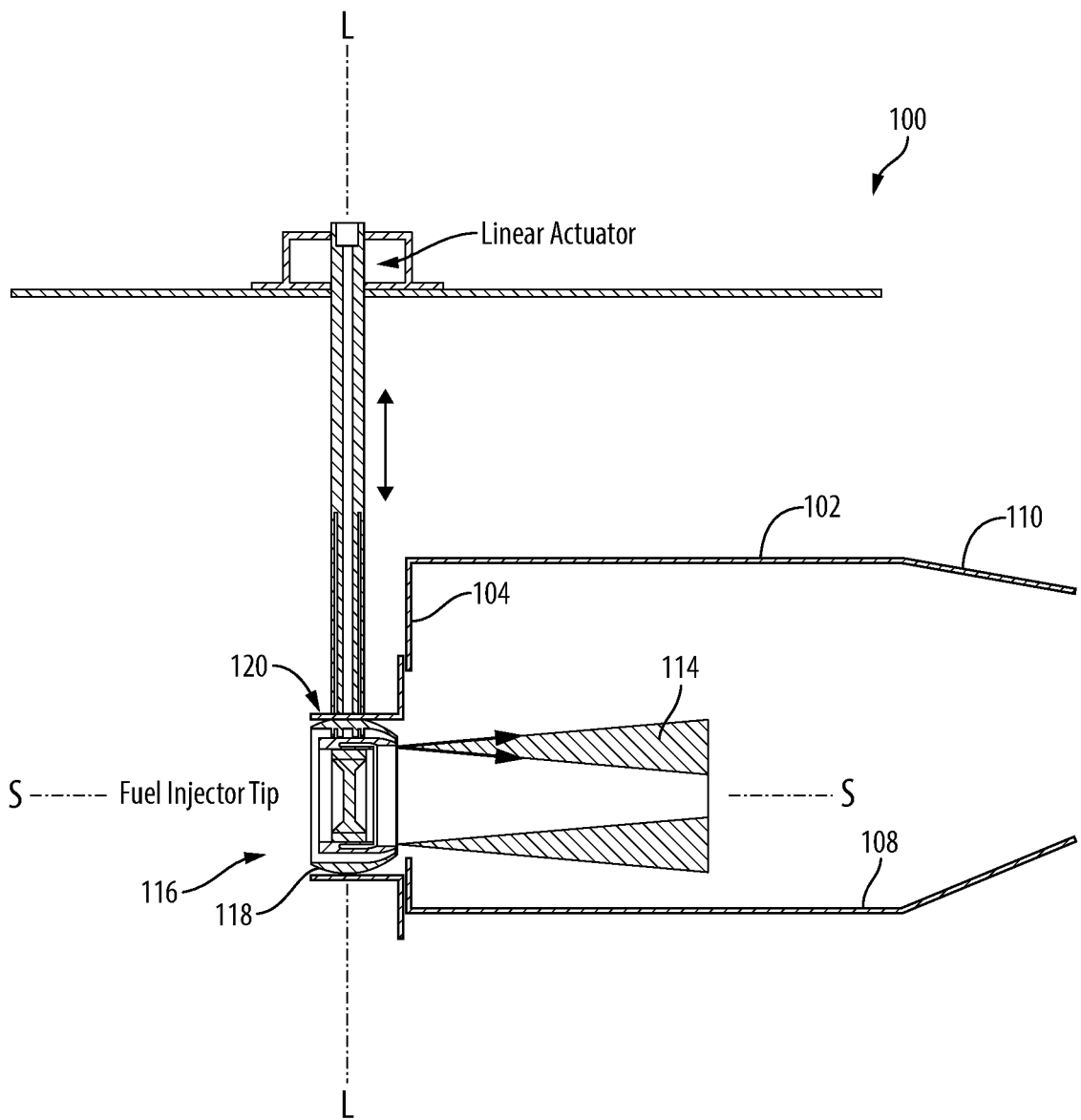
FIG. 14 is a cross-sectional side-elevation view of a portion of the system of FIG. 1, showing an injector mounted of for linear movement relative to the combustor dome.

With reference now to FIG. 14, in addition to or in lieu of rotation, it is also contemplated that the actuator 122 can be configured to move the injector 112 linearly along an actuation axis L. The nozzle 116 can engage with a sliding top hat seal 120 interfacing and sealing between the nozzle 116 and the combustor dome 104, wherein the sliding top hat seal 120 is configured to slide relative to the combustor dome 104 and to be stationary relative to the nozzle 116. The actuation axis L can be perpendicular to the main axis A (not shown in FIG. 14, but see rotation axis R that is perpendicular to the main axis A in FIG. 13).

Systems and methods as disclose herein provide potential benefits including the following. Temperature maldistribution, emissions, acoustics, and operability such as lean blow-out and ignition, are all ongoing issues within gas turbine combustors, and having the ability to selectively modify the placement of fuel into the combustor provides an improvement to these categories. Systems and methods as disclosed herein can actuate at different positions depending on engine condition (e.g., idle, takeoff, cruise) to position for best emissions, temperature pattern factor, or other relevant metric. They may actuate injectors into different positions dependent on a fault. For instance, if one nozzle is plugging up due to internal carbon growth, the other nozzles can compensate by aiming their fuel closer to the faulty nozzle. If a hot spot is detected on a combustor liner due to skewed spray, the nozzle may be adjusted away from the combustor liner. If rotation and/or linear movement can be timed with acoustic instability, systems and methods as disclosed herein can be used to operate out-of-phase to actively control the acoustics.

The methods and systems of the present disclosure, as described above and shown in the drawings, provide for positional control of fuel injection during operation of gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a combustor for a gas turbine defining a main axis extending in an upstream-downstream direction, the combustor including a combustor dome bounding an upstream portion of the combustor, wherein a plurality of injector openings are defined through the combustor dome;
   an injector defining a spray axis aligned with one of the plurality of injector openings for issuing a spray into the combustor along the spray axis;
   an actuator operatively connected to the injector for movement of the injector relative combustor dome to adjust a relative position of the spray axis relative to the main axis; and
   a high pressure case of a gas turbine engine outboard of the combustor, wherein the actuator is positioned outside the high pressure case.

2. The system as recited in claim 1, wherein the actuator is operatively connected to the injector for rotation of the injector relative combustor dome to adjust a relative angle of the spray axis relative to the main axis.

3. The system as recited in claim 2, wherein the actuator and injector are configured to sweep the spray axis over a range of angles relative to the main axis, wherein the range includes a position wherein the spray axis is aligned parallel to the main axis.

4. The system as recited in claim 2, wherein the actuator is configured to rotate the injector about a rotation axis that is radial relative to the main axis.

5. The system as recited in claim 2, wherein the actuator is configured to rotate the injector about a rotation axis that is perpendicular to and radially offset from the main axis.

6. The system as recited in claim 2, wherein the actuator is configured to rotate the injector about a rotation axis that is oblique relative to radials of the main axis, and offset from the main axis.

7. The system as recited in claim 1, wherein the actuator is configured to move the injector linearly relative to the combustor dome.

8. The system as recited in claim 7, wherein the actuator is configured to move the injector linearly along an actuation axis that is perpendicular to the main axis.

9. The system as recited in claim 7, wherein the injector includes a nozzle with a sliding top hat seal interfacing and sealing between the nozzle and the combustor dome, wherein the sliding top hat seal is configured to slide relative to the combustor dome and to be stationary relative to the nozzle.

10. A system comprising:
    a combustor for a gas turbine defining a main axis extending in an upstream-downstream direction, the combustor including a combustor dome bounding an upstream portion of the combustor, wherein a plurality of injector openings are defined through the combustor dome;

a plurality of injectors, each defining a respective spray axis aligned with one of the plurality of injector openings for issuing a spray into the combustor along the respective spray axis;

at least one actuator operatively connected to at least a subset of the plurality of injectors for movement of the subset relative combustor dome to adjust a relative position of the respective spray axes of the subset relative to the main axis, wherein the at least one actuator is a plurality of individual actuators, each operatively connected to move at least one respective injector of the plurality of injectors; and a controller operatively connected to the at least one actuator, wherein the at least one actuator and the controller are configured to actuate the plurality of injectors in banks of injectors, wherein the controller is configured to actuate the plurality of actuators to move each of the injectors in the plurality of injectors identically to one another based on phase of engine operation, and/or the controller is configured to actuate the plurality of actuators to move each of the injectors in the plurality of injectors identically to one another for correcting for adverse combustion conditions.

11. The system as recited in claim 10, wherein the at least one actuator is a single actuator operatively connected for movement of the at least the subset of the plurality of injectors.

12. The system as recited in claim 10, wherein the at least one actuator includes a plurality of actuators, one for each one of the injectors in the plurality of injectors.

13. The system as recited in claim 10, wherein the controller is configured to actuate the plurality of actuators in a regular, circumferential pattern based on phase of engine operation, and/or the controller is configured to actuate the plurality of actuators in a regular, circumferential pattern for correcting for adverse combustion conditions.

14. The system as recited in claim 10, wherein the controller is configured to sweep the plurality of injectors through a range of converging and diverging positions of the spray axes relative to the main axis.

15. The system as recited in claim 14, wherein the controller is configured to sweep the plurality of injectors through a range of clock-wise/counter clock-wise tangential positions of the spray axes relative to the main axis.

16. A system comprising:

a combustor for a gas turbine defining a main axis extending in an upstream-downstream direction, the combustor including a combustor dome bounding an upstream portion of the combustor, wherein a plurality of injector openings are defined through the combustor dome;

a plurality of injectors, each injector of the plurality of injectors defining a respective spray axis aligned with one injector opening of the plurality of injector openings for issuing a spray into the combustor along the respective spray axis;

at least one actuator operatively connected to at least a subset of the plurality of injectors for movement of the subset relative to the combustor dome to adjust a relative position of the respective spray axis of each injector in the subset relative to the main axis, wherein the at least one actuator is a plurality of individual actuators, wherein each individual actuator of the plurality of individual actuators is operatively connected to move at least one respective injector of the plurality of injectors; and a controller operatively connected to the at least one actuator, wherein the at least one actuator and the controller are configured to actuate the plurality of injectors in banks of injectors, wherein the controller is configured to actuate the plurality of actuators to compensate for a faulty one of the injectors, and wherein injectors circumferentially neighboring the faulty injector are moved and actuators circumferentially remote from the faulty one of the injectors are moved less than the injectors circumferentially neighboring the faulty injector.

* * * * *